United States Patent
Yamamoto et al.

(10) Patent No.: US 10,465,134 B2
(45) Date of Patent: Nov. 5, 2019

(54) CHAR RECYCLING SYSTEM AND CHAR CONVEYANCE METHOD

(71) Applicant: MITSUBISHI HITACHI POWER SYSTEMS, LTD., Yokohama (JP)

(72) Inventors: Takashi Yamamoto, Tokyo (JP); Yoshinori Koyama, Tokyo (JP); Yasutaka Mizokoshi, Tokyo (JP); Yasunari Shibata, Tokyo (JP); Haruto Shinoda, Tokyo (JP); Osamu Shinada, Tokyo (JP); Masashi Kitada, Tokyo (JP)

(73) Assignee: MITSUBISHI HITACHI POWER SYSTEMS, LTD., Yokohama (JP)

( * ) Notice: Subject to any disclaimer, the term of this patent is extended or adjusted under 35 U.S.C. 154(b) by 565 days.

(21) Appl. No.: 15/038,273

(22) PCT Filed: Sep. 24, 2014

(86) PCT No.: PCT/JP2014/075163
§ 371 (c)(1),
(2) Date: May 20, 2016

(87) PCT Pub. No.: WO2015/093119
PCT Pub. Date: Jun. 25, 2015

(65) Prior Publication Data
US 2016/0298042 A1    Oct. 13, 2016

(30) Foreign Application Priority Data
Dec. 20, 2013    (JP) .................................. 2013-264311

(51) Int. Cl.
*C10J 3/52*    (2006.01)
*C10J 3/72*    (2006.01)
(Continued)

(52) U.S. Cl.
CPC .............. *C10J 3/723* (2013.01); *C10J 3/485* (2013.01); *C10J 3/526* (2013.01); *C10K 1/026* (2013.01);
(Continued)

(58) Field of Classification Search
CPC ..... C10J 3/52; C10J 3/523; C10J 3/526; C10J 3/54; C10J 3/56; C10J 3/723; C10J 2300/1807
See application file for complete search history.

(56) References Cited

U.S. PATENT DOCUMENTS 8,667,912 B2 *    3/2014    Koyama .................... F23D 1/00
                                                                    110/104 B
9,199,806 B2 *    12/2015    Koyama ................ B65G 53/18
(Continued)

FOREIGN PATENT DOCUMENTS

CN    2180643    10/1994
CN    1455150    11/2003
(Continued)

OTHER PUBLICATIONS

English Translation of WO 2012070453 A1 (obtained from Espacenet) (Year: 2012).*
(Continued)

*Primary Examiner* — Jonathan Miller
*Assistant Examiner* — Jonathan Luke Pilcher
(74) *Attorney, Agent, or Firm* — Wenderoth, Lind & Ponack, L.L.P.

(57) ABSTRACT

A char recycling system capable of easily determining whether or not a char exhausting pipe is blocked by char. The char recycling system comprises: a stand pipe (31) forming a vertically-downwards flowpath (33) through which char is conveyed; and a differential pressure gauge (41) that measures the pressure difference between the
(Continued)

pressure in a downstream area (45) in the vertically-downwards flowpath (33) and the pressure in an upstream area (46) in the vertically-downwards flowpath (33). The pressure difference fluctuates when char accumulates between the downstream area (45) and the upstream area (46) in the vertically-downwards flowpath (33). As a result, this kind of char recovery system is capable of easily determining whether or not the vertically-downwards flowpath (33) is blocked by char, on the basis of the measured pressure difference.

4 Claims, 4 Drawing Sheets

(51) Int. Cl.
    *C10J 3/48*     (2006.01)
    *C10K 1/02*     (2006.01)
    *F01K 23/06*     (2006.01)
    *F01K 23/10*     (2006.01)

(52) U.S. Cl.
    CPC .......... *F01K 23/067* (2013.01); *F01K 23/103* (2013.01); *C10J 3/52* (2013.01); *C10J 2300/093* (2013.01); *C10J 2300/094* (2013.01); *C10J 2300/1653* (2013.01); *C10J 2300/1678* (2013.01); *C10J 2300/1807* (2013.01); *Y02E 20/16* (2013.01); *Y02E 20/18* (2013.01)

(56) References Cited

U.S. PATENT DOCUMENTS

| | | | | |
|---|---|---|---|---|
| 9,446,913 | B2* | 9/2016 | Soda | ............... B65G 53/20 |
| 2010/0180502 | A1* | 7/2010 | Koyama | ............... F23D 1/00 |
| | | | | 48/76 |
| 2011/0284673 | A1 | 11/2011 | Hanrott | |
| 2013/0140168 | A1* | 6/2013 | Koyama | ............... B65G 53/18 |
| | | | | 202/261 |
| 2013/0228641 | A1 | 9/2013 | Hanrott | |
| 2014/0231239 | A1* | 8/2014 | Koyama | ............... B65G 53/18 |
| | | | | 202/261 |
| 2017/0260465 | A1* | 9/2017 | Soda | ............... B65G 53/20 |

FOREIGN PATENT DOCUMENTS

| | | | | |
|---|---|---|---|---|
| CN | | 102131900 | 7/2011 | |
| CN | | 103068703 | 4/2013 | |
| JP | | 05-156265 | 6/1993 | |
| JP | | 10-81886 | 3/1998 | |
| JP | | 3054788 | 6/2000 | |
| JP | | 2002-114987 | 4/2002 | |
| JP | | 2003-336081 | 11/2003 | |
| JP | | 2012-126571 | 7/2012 | |
| JP | | 2012126571 A * | 7/2012 | ............ B65G 53/18 |
| JP | | 2013-170185 | 9/2013 | |
| JP | | 2014-69927 | 4/2014 | |
| WO | | WO-2012070453 A1 * | 5/2012 | ............ B65G 53/18 |

OTHER PUBLICATIONS

International Search Report dated Dec. 9, 2014 in International (PCT) Application No. PCT/JP2014/075163 with English translation.

Written Opinion of the International Searching Authority dated Dec. 9, 2014 in International (PCT) Application No. PCT/JP2014/075163 with English translation.

Chinese Office Action dated May 19, 2017 in corresponding Chinese Patent Application No. 201480064759.4 with English translation.

* cited by examiner

CHAR RECYCLING SYSTEM AND CHAR CONVEYANCE METHOD

TECHNICAL FIELD

The present invention relates to a char recycling system and a char conveyance method, and particularly to a char recycling system and a char conveyance method that are used when char is collected from synthesis gas.

BACKGROUND ART

Coal gasification combined power generation apparatuses are known. Coal gasification combined power generation apparatuses include a coal gasifier, a char recycling device, a gas purification apparatus, a gas turbine, an exhaust heat recovery boiler, a steam turbine, and a power generator. A coal gasifier gasifies pulverized coal, thereby producing synthesis gas having combustibility. In the synthesis gas, char or the like is mixed with inflammable gas.

The char recycling device removes the char from the synthesis gas, thereby producing char-exhausted synthesis gas. The gas purification apparatus purifies the char-exhausted synthesis gas, thereby producing purified synthesis gas. The gas turbine combusts the purified synthesis gas, thereby producing high-temperature high-pressure combustion gas and producing rotational power. The exhaust heat recovery boiler recovers heat energy from the combustion gas, and produces high-pressure steam. The steam turbine produces rotational power using the steam. The power generator converts the rotational power produced by the gas turbine and the steam turbine into electric power.

The char recycling device includes a char recycling device and a char bin that are exemplified by a cyclone and a filter, and a char supply hopper. The char separated from the synthesis gas by the char recycling device is stored in the char bin, and is supplied to a gasifier by the char supply hopper. The char recycling device may include a plurality of char recycling device bodies or may include a plurality of char supply hoppers, in order to increase processing capacity. In this case, a char exhausting pipe that conveys the char forms a flowpath arranged along a straight line that is inclined by a predetermined inclination angle from a vertical direction, thereby downsizing the char recycling device (refer to PTLs 1 to 3).

CITATION LIST

Patent Literature

[PTL 1] Japanese Patent No. 3054788
[PTL 2] Japanese Unexamined Patent Application Publication No. 2012-126571
[PTL 3] Japanese Unexamined Patent Application Publication No. 2013-170185

SUMMARY OF INVENTION

Technical Problem

In such a char recycling system, since the interior of the char exhausting pipe is at a high pressure, it is difficult to determine whether or not the char exhausting pipe is blocked by char. It is desired that it is easily determined whether or not the char exhausting pipe is blocked by char.

An object of the invention is to provide a char recycling system and a char conveyance method that easily determine whether or not the char exhausting pipe is blocked by char.

Another object of the invention is to provide a char recycling system and a char conveyance method that reduce the amount of purge gas for appropriately solving the blockage of the char exhausting pipe.

Still another object of the invention is to provide a char recycling system and a char conveyance method that reduce the frequency of blocking of the char exhausting pipe caused by char.

Solution to Problem

A char recycling system relating to a first aspect of the invention includes a char exhausting pipe that forms a powder flowpath through which char is conveyed; and a differential pressure gauge that measures a pressure difference between the pressure in a downstream area of the powder flowpath and the pressure in an upstream area on an upstream side of the downstream area of the powder flowpath.

The pressure difference fluctuates when char accumulates between the downstream area and the upstream area in the powder flowpath. For this reason, such a char recovery system can easily determine whether or not the powder flowpath is blocked by char, on the basis of the measured pressure difference.

The powder flowpath may include a vertically-downwards flowpath, and an inclined flowpath connected to a downstream side of the vertically-downwards flowpath. In this case, an angle formed between a straight line along which the vertically-downwards flowpath runs, and a horizontal plane is greater than an angle formed between a straight line along which the inclined flowpath runs, and the horizontal plane. The downstream area is arranged at the end of the vertically-downwards flowpath on the inclined flowpath side. The upstream area is arranged above the downstream area of the vertically-downwards flowpath.

In this case, in the powder flowpath, char is apt to accumulate in the inclined flowpath, and a lower end of the vertically-downwards flowpath is apt to be blocked. Such a char recycling system can appropriately determine whether or not the powder flowpath is blocked by char by measuring the pressure difference between the areas of the powder flowpath that are apt to be blocked by char.

The char recycling system relating to the first aspect of the invention may further include a purge gas injection device that injects purge gas to the inclined flowpath; and a control device that controls the purge gas injection device so that the purge gas is injected when the pressure difference is greater than a threshold.

Such a char recycling system can inject purge gas, thereby blowing away char accumulating in the inclined flowpath, and solving blocking of the powder flowpath caused by the char accumulating in the inclined flowpath. Such a char recycling system can inject purge gas only when the pressure difference is greater than the threshold, thereby reducing a frequency at which the purge gas is injected when char has not accumulated and reducing the used amount of purge gas.

The char recycling system relating to the first aspect of the invention may further include a porous plate that isolates the inclined flowpath from a chamber; and an assist gas supply device that supplies assist gas to the chamber. In this case, the control device controls the assist gas supply device so that the amount of supply by which the assist gas is supplied to the chamber varies, on the basis of a frequency at which the pressure difference becomes greater than the threshold.

Such a char recycling system can increase the amount of assist gas to be supplied to the chamber, thereby reducing a frequency at which char deposits in the inclined flowpath, when a frequency at which the pressure difference becomes greater than the threshold is large.

The char recycling system relating to the first aspect of the invention may further include a cyclone that separates synthesis gas produced when coal is gasified into first char and first-char-exhausted synthesis gas; a filter that separates the first-char-exhausted synthesis gas into second char and second-char-exhausted synthesis gas; and a char bin that stores the first char and the second char. In this case, the char exhausting pipe is provided so that the second char is conveyed from the filter to the char bin via the powder flowpath.

Char is more apt to accumulate in the removal pipe that supplies the second char, which is separated out by the filter, to the char bin, compared to a removal pipe that supplies the first char, which is separated out by the cyclone, to the char bin. In such a char recycling system, it is preferable to use the char exhausting pipe for supplying the char, which is separated out by the filter, to the char bin.

A coal gasifier relating to a second aspect of the invention includes the char recycling system according to the first aspect of the invention; and a coal gasifier that gasifies coal, thereby producing synthesis gas. In this case, char stored in the char bin is supplied to the coal gasifier and is gasified together with the coal.

A char conveyance method according to a third aspect of the invention includes conveying char via a powder flowpath; measuring a pressure difference between the pressure at a downstream point of the powder flowpath and the pressure at an upstream point arranged on an upstream side of the downstream point of the powder flowpath; and determining whether or not char has accumulated in the powder flowpath, on the basis of the pressure difference.

Such a char conveyance method can measure the pressure difference, thereby easily determining whether or not char has accumulated in the powder flowpath, and coping appropriately with blocking of the powder flowpath.

Advantageous Effects of Invention

The char recycling system and char conveyance method according to the invention can easily determine whether or not the powder flowpath is blocked by char by measuring the pressure difference between two regions in the powder flowpath through which char is conveyed.

DESCRIPTION OF EMBODIMENTS

Figure 1:
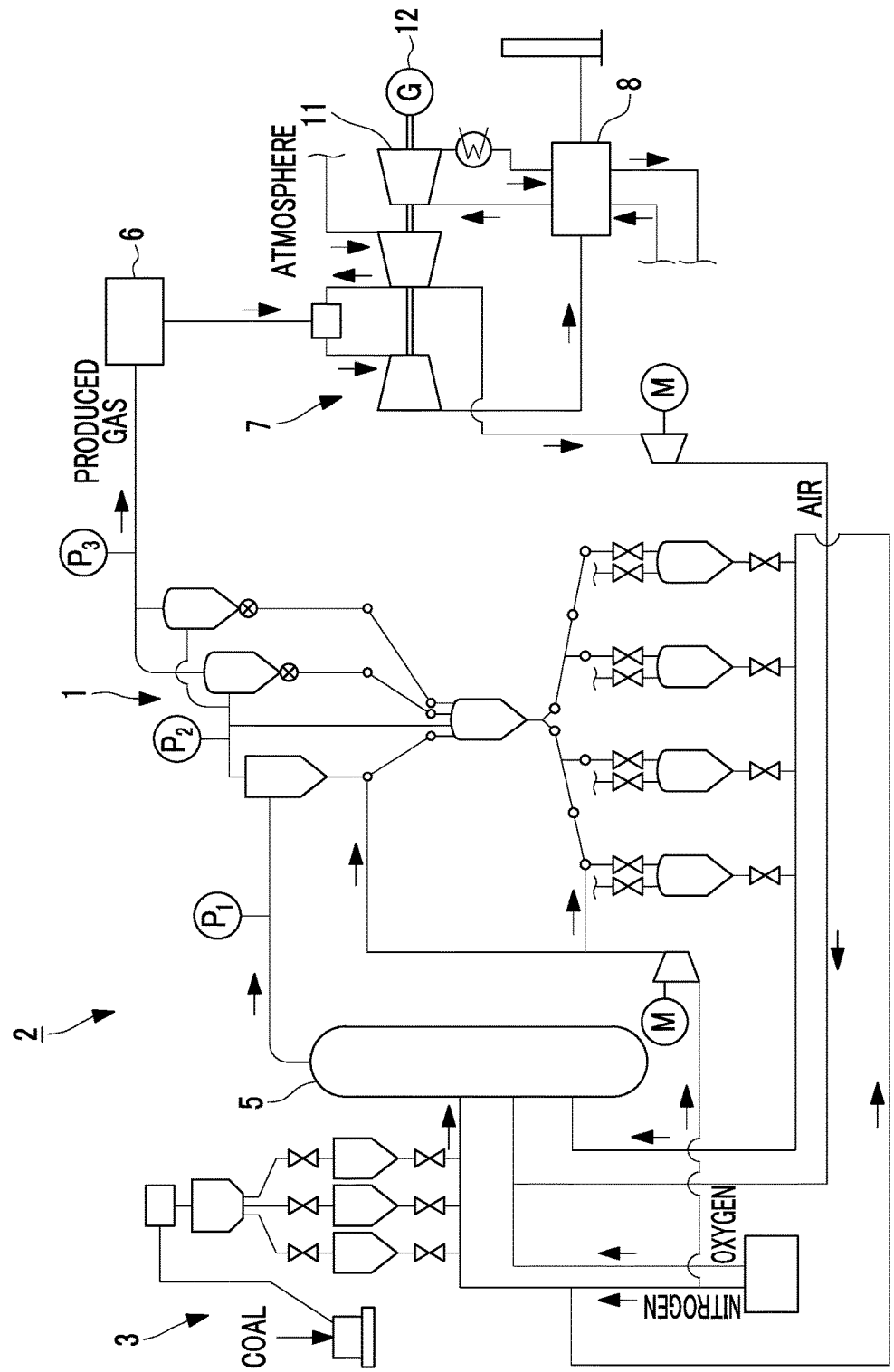
FIG. 1 is a schematic configuration diagram illustrating a coal gasification combined power generation plant to which a char recycling system is applied.

An embodiment of a char recycling system will be described below with reference to the drawings. The char recycling system 1, as illustrated in FIG. 1, is applied to a coal gasification combined power generation plant 2. The coal gasification combined power generation plant 2 includes a coal gasifier apparatus. The coal gasifier apparatus includes a coal feeder 3, a coal gasifier 5, the char recycling system 1, and a gas purification apparatus 6. The coal gasification combined power generation plant further includes a gas turbine 7, a exhaust heat recovery boiler 8, a steam turbine 11, and a power generator 12. The coal feeder 3 produces pulverized coal by pulverizing coal while drying coal. The coal gasifier 5 gasifies the pulverized coal produced by the coal feeder 3 and the char collected by the char recycling system 1, thereby producing synthesis gas. The char is formed of unreacted powder that has not reacted in the coal gasifier 5 in the pulverized coal produced by the coal feeder 3.

The char recycling system 1 collects char from the synthesis gas produced by the coal gasifier 5, thereby producing char-exhausted synthesis gas. The gas purification apparatus 6 purifies the char-exhausted synthesis gas separated out by the char recycling system 1, thereby producing purified synthesis gas. The gas turbine 7 combusts the purified synthesis gas produced by the gas purification apparatus 6 combust, thereby exhausting high-temperature high-pressure combustion gas and producing rotational power. The exhaust heat recovery boiler 8 recovers heat energy from the combustion gas exhausted from the gas turbine 7, and produces high-pressure steam. The steam turbine 11 produces rotational power using the steam produced by the exhaust heat recovery boiler 8. The power generator 12 generates power using the rotational power produced by the gas turbine 7 and the steam turbine 11.

Figure 2:
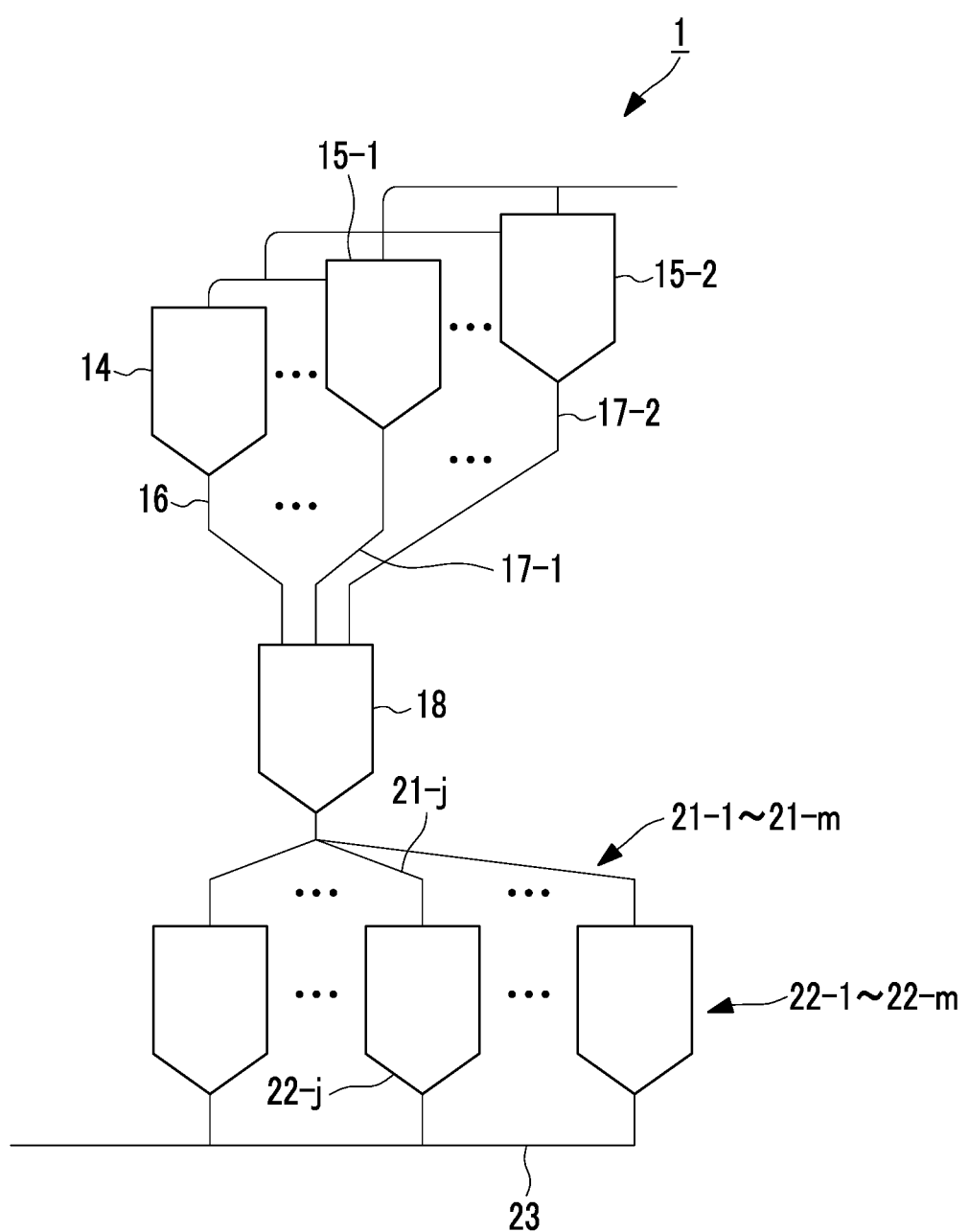
FIG. 2 is a schematic configuration diagram illustrating the char recycling system.

FIG. 2 illustrates the char recycling system 1. The char recycling system 1 includes a cyclone 14, a plurality of filters 15-1 to 15-2, a char exhausting pipe 16 for a cyclone, a plurality of char exhausting pipes 17-1 to 17-2 for filters, and a char bin 18. The cyclone 14 allows the synthesis gas produced by the coal gasifier 5 to flow thereinto in the shape of a funnel or so as to draw a vortex inside a cylinder, thereby centrifugally separating the synthesis gas into first char and first-char-exhausted synthesis gas. An arbitrary filter 15-$i$ ($i$=1, 2) of the plurality of filters 15-1 to 15-2 includes a porous filter. The filter 15-$i$ filters the first-char-exhausted synthesis gas separated out by the cyclone 14 using the porous filter, thereby separating the synthesis gas into second-char-exhausted synthesis gas and second char. The filter 15-$i$ further reverse-washes the porous filter, thereby intermittently discharging the second char.

The char exhausting pipe 16 for a cyclone conveys the first char separated out by the cyclone 14 to the char bin 18. The plurality of filters 15-1 to 15-2 correspond to the plurality of char exhausting pipes 17-1 to 17-2 for filters. A char exhausting pipe 17-$i$ for a filter corresponding to a filter 15-$i$ of the plurality of char exhausting pipes 17-1 to 17-2 for filters conveys the second char, which is discharged from the filter 15-$i$, to the char bin 18.

The char bin 18 stores the first char supplied via the char exhausting pipe 16 for a cyclone and the second char supplied via the plurality of char exhausting pipes 17-1 to 17-2 for filters.

The char recycling system 1 further includes a plurality of char exhausting pipes 21-1 to 21-$m$ ($m$=2, 3, 4, . . . ) for hoppers, and a plurality of char supply hoppers 22-1 to 22-$m$, and a char return line 23. The plurality of char exhausting pipes 21-1 to 21-$m$ for hoppers correspond to the plurality of char supply hoppers 22-1 to 22-$m$. An arbitrary char exhausting pipe 21-$j$ for a hopper of the plurality of char exhausting pipes 21-1 to 21-*m* (j=1, 2, 3, . . . , m) for hoppers conveys the char stored in the char bin 18 from a char supply hopper 22-*j* corresponding to a char exhausting pipe 21-*j* for a hopper among the plurality of char supply hoppers 22-1 to 22-*m*.

The char supply hopper 22-*j* intermittently supplies char which is supplied from the char bin 18 via the char exhausting pipe 21-*j* for a hopper, to the char return line 23. The char return line 23 conveys char, which is supplied from the plurality of char supply hoppers 22-1 to 22-*m*, to the coal gasifier 5.

Figure 3:
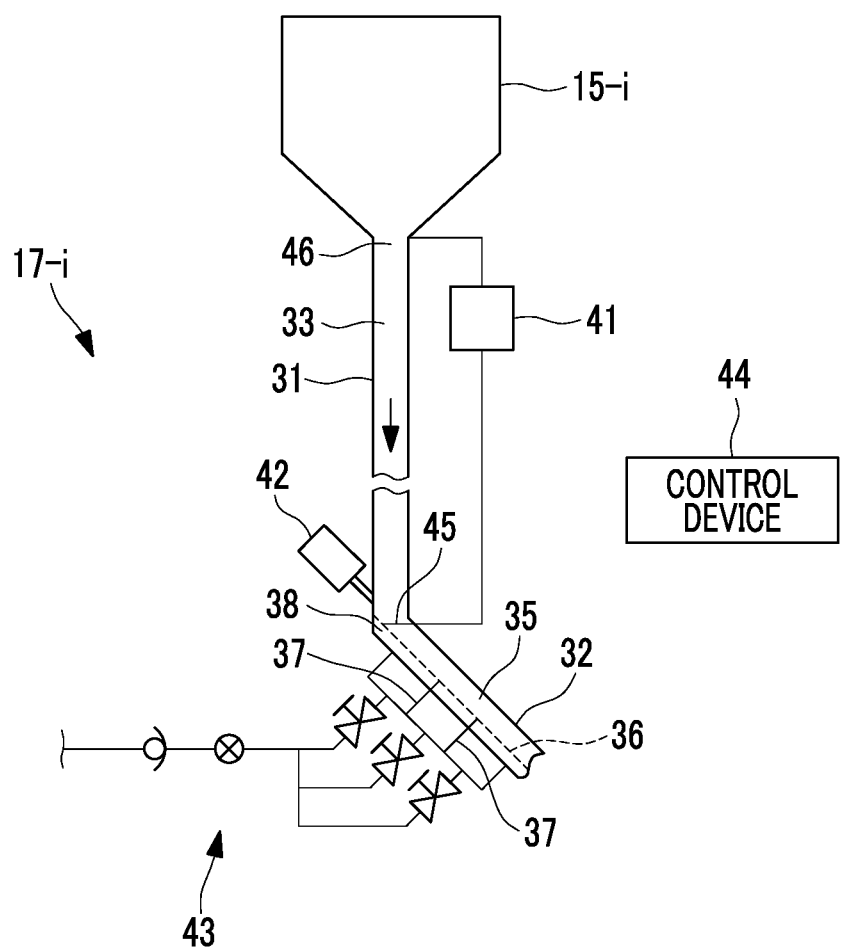
FIG. 3 is a side view illustrating a char exhausting pipe for a filter.

FIG. 3 illustrates the char exhausting pipe 17-*i* for a filter. The char exhausting pipe 17-*i* for a filter includes a stand pipe 31 and a slider pipe 32. The stand pipe 31 forms a vertically-downwards flowpath 33 running along a vertical line parallel to a vertical direction. The slider pipe 32 has one end joined to a lower end of the stand pipe 31, and forms an inclined flowpath 35 connected to the vertically-downwards flowpath 33. The slider pipe 32 is formed so that the inclined flowpath 35 runs along a straight line that is not parallel to the vertical direction. The slider pipe 32 is arranged so that a position where an end thereof joined to the stand pipe 31 is orthogonally projected on the vertical line is arranged vertically above a position where an opposite end thereof is orthogonally projected on the vertical line.

The char exhausting pipe 17-*i* for a filter further includes a porous plate 36 and a plurality of partition plates 37. The porous plate 36 is formed of a flat metal plate in which a plurality of holes are formed so that assist gas passes therethrough and so that char does not pass therethrough. The porous plate 36 is arranged inside the slider pipe 32 so as to divide the interior of the slider pipe 32 into the inclined flowpath 35 and a plurality of chambers 38 and so as to form a lower inner wall of the inclined flowpath 35. The plurality of chambers 38 are arranged so as to be lined up parallel to the straight line along which the inclined flowpath 35 runs. The plurality of partition plates 37 are formed of a metal plate through which assist gas does not pass. The plurality of partition plates 37 isolate the plurality of chambers 38 from each other.

The char exhausting pipe 17-*i* for a filter further includes a differential pressure gauge 41, a purge gas injection device 42, an assist gas supply device 43, and a control device 44. The differential pressure gauge 41 measures a pressure difference between the pressure of a downstream area 45 arranged at a lower end of the vertically-downwards flowpath 33 of the stand pipe 31 and the pressure of an upstream area 46 arranged at an upper end of the vertically-downwards flowpath 33, displays the pressure difference so as to be recognizable by a user, and transmits the pressure difference to the control device 44. The purge gas injection device 42 includes a nozzle arranged at the end of the inclined flowpath 35 of the slider pipe 32 connected to the vertically-downwards flowpath 33. The purge gas injection device 42 injects purge gas from an upstream end of the inclined flowpath 35 via the nozzle toward a downstream side of the inclined flowpath 35 when controlled by the control device 44. As the purge gas, nitrogen gas, carbon dioxide gas, inert gas whose oxygen concentration is 3% or less, and inflammable gas are exemplified. As the inflammable gas, the char-exhausted synthesis gas produced by the char recycling system 1 and the purified synthesis gas produced by the gas purification apparatus 6 are exemplified.

When controlled by the control device 44, the assist gas supply device 43 supplies assist gas to the plurality of chambers 38 so that the atmospheric pressure of each of the plurality of chambers 38 reaches a predetermined pressure. As the assist gas, nitrogen gas, carbon dioxide gas, inert gas whose oxygen concentration is 3% or less, and inflammable gas are exemplified. As the inflammable gas, the char-exhausted synthesis gas produced by the char recycling system 1 and the purified synthesis gas produced by the gas purification apparatus 6 are exemplified.

The control device 44 intermittently collects a pressure difference measured by the differential pressure gauge 41 from the differential pressure gauge 41. The control device 44 determines whether or not the vertically-downwards flowpath 33 is blocked, that is, whether not char accumulates on the vertically-downwards flowpath 33, on the basis of the collected pressure difference. For example, the control device 44 determines that char does not accumulate on the vertically-downwards flowpath 33 when the absolute value of the pressure difference is smaller than a preset pressure difference threshold, and determines that char does not accumulate on the vertically-downwards flowpath 33 when the pressure difference is greater than the pressure difference threshold.

The control device 44 controls the purge gas injection device 42 so that purge gas is injected from the upstream end of the inclined flowpath 35 toward the downstream side of the inclined flowpath 35 when it is determined that char accumulates on the vertically-downwards flowpath 33. The control device 44 calculates frequency at which the pressure difference becomes greater than the pressure difference threshold. The control device 44 controls the assist gas supply device 43 so that the amount of assist gas supplied to the plurality of chambers 38 increases when the calculated frequency is greater than a preset frequency threshold.

An embodiment of a char conveyance method is executed using the char exhausting pipe 17-*i* for a filter of the char recycling system 1, during the operation of the coal gasification combined power generation plant 2. The cyclone 14 centrifugally separates the synthesis gas produced by the coal gasifier 5 into the first char and the first-char-exhausted synthesis gas, during the operation of the coal gasification combined power generation plant 2. The char exhausting pipe 16 for a cyclone conveys the first char separated out by the cyclone 14 to the char bin 18.

The filter 15-*i* filters the first-char-exhausted synthesis gas separated out by the cyclone 14, thereby separating the synthesis gas into the second-char-exhausted synthesis gas and the second char. The filter 15-*i* intermittently discharges the separated second char to the char exhausting pipe 17-*i* for a filter.

When the control device 44 controls the assist gas supply device 43, assist gas is supplied to the plurality of chambers 38 of the char exhausting pipe 17-*i* for a filter so that the amount of supply to a chamber closer to the vertically-downwards flowpath 33 among the plurality of chambers 38 become greater. If the second char of the char exhausting pipe 17-*i* for a filter is discharged, the second char is first supplied to the vertically-downwards flowpath 33. If the second char is supplied to the vertically-downwards flowpath 33, the second char falls due to gravity, and is thereby moved in a vertically downward direction in the vertically-downwards flowpath 33 and supplied to the inclined flowpath 35. If the second char is supplied to the inclined flowpath 35, the second char accumulates on the porous plate 36. If assist gas is supplied via the porous plate 36, the second char is liquefied, friction with the porous plate 36 is reduced, and the second char flows on the porous plate 36 due to gravity. When the second char flows on the porous plate 36, the second char flows to the downstream side and is supplied to the char bin 18.

When assist gas is supplied to the inclined flowpath 35 via the porous plate 36 the char exhausting pipe 17-*i* for a filter can reduce the friction between the porous plate 36 and the second char, the second char can be made to flow smoothly in the inclined flowpath 35 even in a case where the inclination of the inclined flowpath 35 is gentle, and the second char can be appropriately conveyed.

The control device 44 intermittently collects the pressure difference between the downstream area 45 and the upstream area 46 from the differential pressure gauge 41. The control device 44 determines that char does not accumulate on the vertically-downwards flowpath 33 when the absolute value of the collected pressure difference is smaller than the preset pressure difference threshold, and determines that char does not accumulate on the vertically-downwards flowpath 33 when the pressure difference is greater than the pressure difference threshold.

The control device 44 controls the purge gas injection device 42 so that purge gas is not injected to the inclined flowpath 35 when it is determined that char does not accumulate on the vertically-downwards flowpath 33. The control device 44 controls the purge gas injection device 42, thereby injecting purge gas from the upstream end of the inclined flowpath 35 toward the downstream side of the inclined flowpath 35 when it is determined that char accumulates on the vertically-downwards flowpath 33.

The control device 44 further calculates frequency at which the pressure difference becomes greater than the threshold. The control device 44 controls the assist gas supply device 43, thereby increasing the amount of supply at which assist gas is supplied to the plurality of chambers 38, when the calculated frequency is greater than the preset frequency threshold.

The char bin 18 temporarily stores the first char supplied via the char exhausting pipe 16 for a cyclone and the second char supplied via the plurality of char exhausting pipes 17-1 to 17-2 for filters. The plurality of char exhausting pipes 21-1 to 21-*m* for hoppers conveys the char stored in the char bin 18 to the plurality of char supply hoppers 22-1 to 22-*m*, respectively. The plurality of char supply hoppers 22-1 to 22-*m* supply the char, which is supplied via the plurality of char exhausting pipes 21-1 to 21-*m* for hoppers, to the coal gasifier 5 via the char return line 23.

Figure 4:
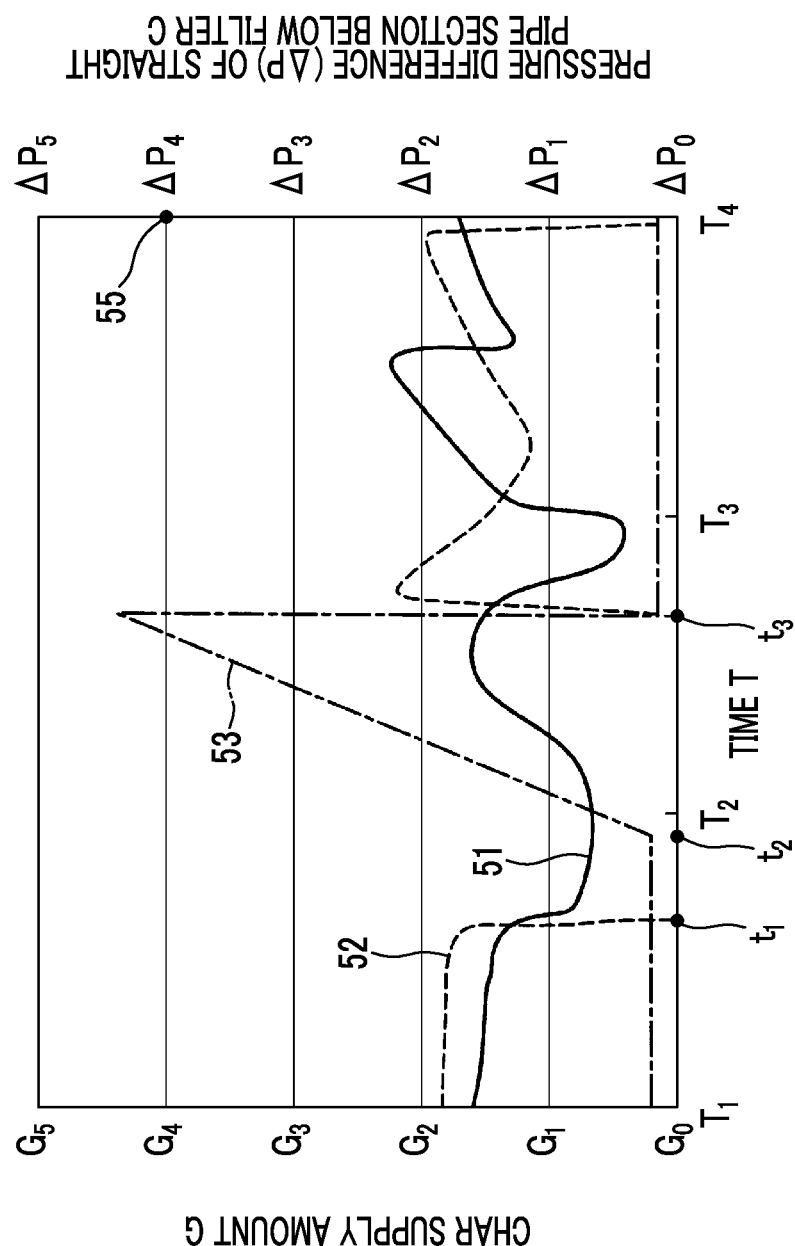
FIG. 4 is a graph illustrating changes in the amount of supplied char, and changes in the amount of received char, and illustrates changes in pressure difference measured by a differential pressure gauge.

FIG. 4 illustrates changes in the amount of supplied char with which the filter 15-*i* supplies the second char to the char exhausting pipe 17-*i* for a filter. Char supply amount changes 51 show that the filter 15-*i* always supplies the second char to the char exhausting pipe 17-*i* for a filter, although the amount of supplied char fluctuates with time.

FIG. 4 further illustrates changes in the amount of received char with which the char bin 18 receives char from the char exhausting pipe 17-*i* for a filter. Char reception amount changes 52 show that the char bin 18 no longer has char supplied thereto from the char exhausting pipe 17-*i* for a filter after a time t1. The char supply amount changes 51 and the char reception amount changes 52 show that the char exhausting pipe 17-*i* for a filter does not supply char to the char bin 18 although char is supplied to the char exhausting pipe 17-*i* for a filter, and show that blocking caused by char has occurred in the vertically-downwards flowpath 33 or the inclined flowpath 35 at the time t1.

FIG. 4 further illustrates changes in pressure difference measured by the differential pressure gauge 41. Pressure difference changes 53 show that pressure differences rise from a time t2 after the time t1. The char supply amount changes 51, the char reception amount changes 52, and the pressure difference changes 53 show that pressure differences rise when blocking caused by char has occurred in the vertically-downwards flowpath 33 or the inclined flowpath 35.

The control device 44 controls the purge gas injection device 42, thereby injecting purge gas to the inclined flowpath 35, at a time t3 when a pressure difference measured by the differential pressure gauge 41 becomes greater than a pressure difference threshold 55.

The char reception amount changes 52 show that the char bin 18 has char again supplied thereto from the char exhausting pipe 17-*i* for a filter after the time t3, and shows that the blocking caused by the char in the vertically-downwards flowpath 33 or the inclined flowpath 35 has been solved after the time t3. Pressure difference changes 53 show that a pressure difference measured by the differential pressure gauge 41 after the time t3 becomes smaller than the pressure difference threshold 55. For this reason, the char reception amount changes 52 and the pressure difference changes 53 show that occurrence of the blocking caused by the char in the vertically-downwards flowpath 33 or the inclined flowpath 35 can be appropriately estimated on the basis of the pressure difference measured by the differential pressure gauge 41.

That is, the char recycling system 1 can appropriately estimate occurrence of the locking caused by the char in the vertically-downwards flowpath 33 or the inclined flowpath 35, on the basis of the pressure difference measured by the differential pressure gauge 41. The char recycling system 1 can inject purge gas to the inclined flowpath 35, thereby solving the blocking caused by the char in the vertically-downwards flowpath 33 or the inclined flowpath 35, when the pressure difference measured by the differential pressure gauge 41 becomes greater than the pressure difference threshold. Since the char recycling system 1 injects purge gas to the inclined flowpath 35 only when the pressure difference measured by the differential pressure gauge 41 becomes greater than the pressure difference threshold, the amount of the purge gas used can be reduced as compared to a char recycling system of a comparative example in which the blocking is solved by intermittently injecting purge gas to the inclined flowpath 35 irrespective of the pressure difference measured by the differential pressure gauge 41.

As the amount of supply by which assist gas is supplied to the plurality of chambers 38 is larger, char does not easily accumulate in the inclined flowpath 35. For this reason, since the char recycling system 1 increases the amount of supply by which assist gas is supplied to the plurality of chambers 38 when a frequency at which the pressure difference measured by the differential pressure gauge 41 becomes greater than the pressure difference threshold is greater than the frequency threshold, it is possible to prevent char for accumulating in the inclined flowpath 35, and a frequency at which the vertically-downwards flowpath 33 or the inclined flowpath 35 is blocked can be reduced.

Char is apt to accumulate in the inclined flowpath as it becomes closer to the vertically-downwards flowpath 33. The char recycling system 1 can supply assist gas to the plurality of chambers 38 so that a chamber closer to the vertically-downwards flowpath 33 among the plurality of chambers 38 has a larger amount of supply, thereby preventing char from easily accumulating in the inclined flowpath 35. The char recycling system 1 can further reduce the amount of the assist gas used as compared to the char recycling system of the comparative example in which the amounts of supply by which assist gas is supplied to the plurality of chambers 38 are equal to each other.

The char recycling system 1 can further supply assist gas to the plurality of chambers 38 so that the amounts of supply by which assist gas is supplied to the plurality of chambers 38 become equal to each other. Even in this case, the char recycling system 1 can appropriately estimate the blocking of the vertically-downwards flowpath, on the basis of a pressure difference between two regions in the vertically-downwards flowpath 33.

The slider pipe 32 can also be replaced with other slider pipes to which assist gas is not supplied. The char recycling system to which such a slider piper is applied can appropriately estimate the blocking of the vertically-downwards flowpath, on the basis of a pressure difference between two regions in the vertically-downwards flowpath 33.

In addition, the vertically-downwards flowpath 33 can be replaced with other vertically-downwards flowpaths running along a straight line that is not parallel to the vertical direction. In this case, the vertically-downwards flowpaths are formed so that an angle formed between the straight line along which the vertically-downwards flowpath runs, and the horizontal plane, becomes greater than an angle formed between the straight line along the inclined flowpath 35 runs, and the horizontal plane. Char recycling systems to which such vertically-downwards flowpaths are applied can also appropriately estimate the blocking of the vertically-downwards flowpaths, on the basis of pressure differences between two regions in the vertically-downwards flowpaths.

The char recycling system 1 does not need to provide one assist gas supply device 43 for each of the plurality of char exhausting pipes 17-1 to 17-2 for filters, and can also include one assist gas supply device with respect to the plurality of char exhausting pipes 17-1 to 17-2 for filters. The char recycling system 1 does not need to provide one control device 44 for each of the plurality of char exhausting pipes 17-1 to 17-2 for filters, and can also include one control device with respect to the plurality of char exhausting pipes 17-1 to 17-2 for filters. Such char recycling systems can also appropriately estimate the blocking of the vertically-downwards flowpath 33, similar to the char recycling system 1 in the embodiment as stated earlier.

In the char recycling system 1, the char exhausting pipe 16 for a cyclone can also be formed similar to the char exhausting pipe 17-$i$ for a filter. In this case, the char recycling system 1 can appropriately estimate the blocking of the char exhausting pipe 16 for a cyclone, similar to the char exhausting pipe 17-$i$ for a filter. In the char recycling system 1, the char exhausting pipe 21-$j$ for a hopper can also be formed similar to the char exhausting pipe 17-$i$ for a filter. In this case, the char recycling system 1 can appropriately estimate the blocking of the char exhausting pipe 21-$j$ for a hopper, similar to the char exhausting pipe 17-$i$ for a filter.

REFERENCE SIGNS LIST

1: CHAR RECYCLING SYSTEM
2: COAL GASIFICATION COMBINED POWER GENERATION PLANT
3: COAL FEEDER
5: COAL GASIFIER
6: GAS PURIFICATION APPARATUS
7: GAS TURBINE
8: EXHAUST HEAT RECOVERY BOILER
11: STEAM TURBINE
12: POWER GENERATOR
14: CYCLONE
15-1 TO 15-2: A PLURALITY OF FILTERS
16: CHAR EXHAUSTING PIPE FOR CYCLONE
17-1 TO 17-2: A PLURALITY OF CHAR EXHAUSTING PIPES FOR FILTERS
18: CHAR BIN
21-1 TO 21-$m$: A PLURALITY OF CHAR EXHAUSTING PIPES FOR HOPPERS
22-1 TO 22-$m$: A PLURALITY OF CHAR SUPPLY HOPPERS
23: CHAR RETURN LINE
31: STAND PIPE
32: SLIDER PIPE
33: VERTICALLY-DOWNWARDS FLOWPATH
35: INCLINED FLOWPATH
36: POROUS PLATE
37: A PLURALITY OF PARTITION PLATES
38: A PLURALITY OF CHAMBERS
41: DIFFERENTIAL PRESSURE GAUGE
42: PURGE GAS INJECTION DEVICE
43: ASSIST GAS SUPPLY DEVICE
44: CONTROL DEVICE
45: DOWNSTREAM AREA
46: UPSTREAM AREA

The invention claimed is:

1. A char recycling system comprising:
a cyclone that separates char from synthesis gas;
a char exhausting pipe that forms a powder flowpath through which the char separated by the cyclone is conveyed; and
a differential pressure gauge that measures a pressure difference between pressure in a downstream area of the powder flowpath and pressure in an upstream area on an upstream side of the downstream area of the powder flowpath,
wherein the powder flowpath includes:
a vertically-downwards flowpath; and
an inclined flowpath connected to a downstream side of the vertically-downwards flowpath,
wherein an angle formed between a straight line, along which the vertically-downwards flowpath runs, and a horizontal plane is greater than an angle formed between a straight line, along which the inclined flowpath runs, and the horizontal plane,
wherein the downstream area is arranged at an end of the vertically-downwards flowpath on an inclined flowpath side,
wherein the upstream area is arranged above the downstream area of the vertically-downwards flowpath,
wherein the char recycling system further comprises:
a purge gas injection device that injects purge gas to the inclined flowpath;
a porous plate that isolates the inclined flowpath from a chamber;
an assist gas supply device that supplies assist gas to the chamber; and
a control device that controls the purge gas injection device so that the purge gas is injected when the pressure difference is greater than a pressure difference threshold and the purge gas is not injected when the pressure difference is smaller than the pressure difference threshold, and
wherein the control device calculates a frequency at which the pressure difference becomes greater than the pressure difference threshold, and controls the assist gas supply device so that an amount of the assist gas supplied to the chamber increases when the calculated frequency is greater than a preset frequency threshold.

2. The char recycling system according to claim 1, further comprising:
  a filter that separates the synthesis gas from the cyclone into second char and second-char-exhausted synthesis gas; and
  a char bin that stores the char and the second char,
  wherein the char exhausting pipe is provided so that the second char is conveyed from the filter to the char bin via the powder flowpath.

3. A coal gasifier comprising:
  the char recycling system according to claim 2; and
  a coal gasifier that gasifies coal, thereby producing the synthesis gas,
  wherein the char and the second char stored in the char bin is supplied to the coal gasifier and is gasified together with the coal.

4. A char conveyance method comprising:
  separating char from synthesis gas by a cyclone;
  conveying the char separated by the cyclone via a powder flowpath; and
  measuring a pressure difference between pressure at a downstream point of the powder flowpath and pressure at an upstream point arranged on an upstream side of the downstream point of the powder flowpath,
  wherein the powder flowpath includes:
    a vertically-downwards flowpath; and
    an inclined flowpath connected to a downstream side of the vertically-downwards flowpath,
  wherein an angle formed between a straight line, along which the vertically-downwards flowpath runs, and a horizontal plane is greater than an angle formed between a straight line, along which the inclined flowpath runs, and the horizontal plane,
  wherein the downstream area is arranged at an end of the vertically-downwards flowpath on an inclined flowpath side,
  wherein the upstream area is arranged above the downstream area of the vertically-downwards flowpath, and
  wherein the char conveyance method further comprises:
    controlling a purge gas injection device so that purge gas is injected to the inclined path when the pressure difference is greater than a pressure difference threshold and the purge gas is not injected when the pressure difference is smaller than the pressure difference threshold; and
    calculating a frequency at which the pressure difference becomes greater than the pressure difference threshold and controlling an assist gas supply device so that an amount of assist gas supplied to a chamber increases when the calculated frequency is greater than a preset frequency threshold.

\* \* \* \* \*